United States Patent [19]

Casey

[11] Patent Number: 4,869,829

[45] Date of Patent: Sep. 26, 1989

[54] PROCESS FOR SEPARATING SOLIDS WITH A KERATIN FILTER AID

[75] Inventor: Larry D. Casey, Zachary, La.

[73] Assignee: Nalco Chemical Company, Naperville, Ill.

[21] Appl. No.: 213,143

[22] Filed: Jun. 29, 1988

[51] Int. Cl.$^4$ .............................................. B01D 37/02
[52] U.S. Cl. .................................... 210/706; 210/727; 210/734; 210/735; 210/777
[58] Field of Search ................ 210/727, 729, 730, 734, 210/735, 778, 706, 777

[56] References Cited

U.S. PATENT DOCUMENTS

| | | | |
|---|---|---|---|
| 3,617,568 | 11/1971 | Ries | 210/727 |
| 3,725,261 | 4/1973 | Moraga | 210/38 |
| 3,951,795 | 4/1976 | Doncer et al. | 210/777 |
| 4,141,888 | 2/1979 | Matsuda et al. | 210/688 |
| 4,177,141 | 12/1979 | Nakamura et al. | 210/777 |
| 4,512,890 | 4/1985 | Medbury | 210/335 |
| 4,569,768 | 2/1986 | McKinley | 210/727 |
| 4,670,158 | 6/1987 | Kelly | 210/727 |
| 4,753,738 | 6/1988 | Huang | 210/727 |
| 4,758,353 | 7/1988 | Spence et al. | 210/727 |
| 4,790,943 | 12/1988 | Dunn et al. | 210/727 |

OTHER PUBLICATIONS

Abstract CA92(22), Fr. Demande FR 2425878.
Abstract CA80(10), Japan. JP 48/6712.
Abstract AC102(16), Water(Melbourne), 12(2), 17–20.

*Primary Examiner*—Richard V. Fisher
*Assistant Examiner*—Coreen Y. Lee
*Attorney, Agent, or Firm*—Joan I. Norek; John G. Premo; Donald G. Epple

[57] ABSTRACT

A water clarification process wherein solids are separated by filtration through a porous septum utilizes as a filter precoat a coating of keratin-composition in the form of particles wherein at least 75 weight percent of the particles have a particle size no greater than 2.0 mm. In preferred embodiment, the material to be filtered is first treated with a combination of an organic polymeric flocculant and an organic polymer coagulant.

34 Claims, No Drawings

PROCESS FOR SEPARATING SOLIDS WITH A KERATIN FILTER AID

TECHNICAL FIELD OF THE INVENTION

The present invention is in the field of water clarification treatment, and ore particularly the field of water clarification treatment utilizing in part filtration methods to remove suspended solids from the water.

BACKGROUND OF THE INVENTION

In many water clarification treatment processes the separation of solids from liquid(s) is effectuated at least in part by filtration. The filtration may be effectuated through a bed of granular media or through a membrane or septum with or without a filter aid. A typical filtration aid, such as diatomaceous earth, is often applied as to slurry to a porous septum, forming a precoat that strains, or helps strain, the suspended solids in the liquid passed through. Granular media or filtration aids may become to a degree admixed with the solids being strained, and for some processes, particularly those in which the solids are collected for subsequent use or recycling, the granular media or filtration aid admixture with the collected solids or sludge is undesirable. Further processing to separate the material used to strain the solids from the solids collected generally is uneconomical. For instance, in food processing industries, the solids collected from process water, that is, water used for washing the raw foodstuff, conveying the products from one process area to another, extracting and the like, may be substantially derived from the foodstuff itself and hence be useful material for producing inexpensive food matter, such as animal feed or the like. Granular material, such as sand, diatomaceous earth, and the like may be undesirable components of such collected solids, and yet the end use of such solids does not justify the expense of separating the granular media from the solids.

Such filtration processes are often preceded by chemical water treatments and other physical treatments. For instance, coagulant or flocculant chemicals are added to the water being clarified to assist in concentrating the solids to be removed. Where the solids are light, i.e., have specific gravities near, or less than, the liquid in which they are suspended, air-flotation way be used to concentrate the solids by floating them to the surface by air bubbles, rather than concentration by settling. In dissolved air flotations systems (DAF systems) the water being clarified is pressurized and supersaturated with air. Upon reduction of pressure, the air comes out of solution, forming microbubbles which float the solids upward to the surface. In DAF units often a chemical treatment will be added at the point in the system where the bubbles are forming and contacting the solids to be removed. Solids concentrated by air flotation are generally referred to as "floats" and as such floats may be subjected to filtration, forming a "cake", i.e., the build-up of solids on the surface of the filter or filter bed.

As mentioned above, the end use of the solids being separated may render the use of certain granular media undesirable. Where the solids being separated are generally organic in nature, there may be a need for a granular media that is likewise organic in nature, for instance in the filtration of solids from the process water of food processing plants. Such granular media must, however, to be commercially feasible meet the industry standards both as to its ability to strain the solids and as to passing the liquid, usually water, through. Concentration of the solids, reducing the water content, is an important feature, as is the reduction of suspended solids in the water that passes through.

It is the object of the present invention to provide a filtration process, and filter media therefor, wherein the filter media becomes incorporated into the cake substantially without increasing the inorganic content thereof, while providing clear filtrate and high density cake. These and other objects of the present invention are described in more detail below.

DISCLOSURE OF THE INVENTION

The present invention provides a process for separating solids from aqueous medium by filtration through a porous septum wherein a coating of keratin composition is applied to the upstream surface of the porous septum before the solids-containing aqueous medium is contacted with the upstream surface. The keratin-composition is in the form of particles wherein at least 75 weight percent thereof have a particle size no greater than 2.0 mm. Upon contacting the solids containing aqueous medium with the coated septum, the aqueous medium is permitted at least partially to flow through the porous septum, whereby the solids are at least partially filtered out.

The present invention also provides in an embodiment a process for dewatering sludge by filtration through a porous septum, wherein a precoat of keratin-composition meal is applied to the septum prior to filtration. The sludge may be concentrated prior to such filtration, as described in more detail below.

In other embodiment, the solids, which in instances may be sludge, is treated prior to filtration with a combination of an organic polymeric flocculant and an organic polymeric coagulant.

PREFERRED EMBODIMENTS OF THE INVENTION

Keratin is a sulfur containing protein that functions as a biological structural material, and may be considered the base composition of horny epidermal outgrowths such as feathers, horns, hoofs, hair, wool, and the like. Feathers, for instance, comprise, from about 70 to about 80 percent keratin. As used herein the term "keratin-composition" refers to substances having a high keratin content such as feathers, horns, hoofs, hair, wool, and other substances containing at least 50 weight percent keratin, and preferably containing at least about 70 weight percent keratin.

By the term "keratin-composition meal" is meant herein keratin-composition that has been comminuted to fine particles wherein at least 75 weight percent of the particles have a particle size of 2.0 mm or less. Keratin-composition meal may be prepared in some instances by grinding, but a preferred embodiment utilizes poultry feathers that have been processed in a steam pressure cooker at elevated temperatures to provide material with substantially the desired particle size, so that material that is too large may be removed in a shaker screen.

The present invention is particularly useful for those industries where it is desirable to recycle the solids removed from the liquid, such as the solids removed from the process water stream, for purposes where low ash content is desirable. By ash as used herein is meant the solid residue that is left went combustible material is thoroughly burned or oxidized by chemical means. Such ash is typically inorganic in nature. The use of keratin-composition meal as a filter medium, particularly when used in such manner that at least some of it becomes incorporated into the recovered solids, adds little to no ash to the solids.

The present invention is also particularly useful for those industries wherein keratin-compositions are a normal by-product, such as in poultry processing plants, where there is a high proportion of feathers obtained in the normal course of the processing. In such industries the use of keratin-composition meal as a filtration medium for other solid waste products from the process water stream and then the further processing of the solids recovered, together with the keratin-composition meal, into useful products such as animal feed and the like, integrates the various processes and provides significant advantages. Any material from the poultry being processed that is removed in the processing of the poultry products is a potential pollutant. There is hence a need for removing such potential waste products from the water streams in such industries, particularly the process water streams, and the use of one of the industries own by-products, here the feathers, for collecting other solid material in a form useful for other purposes is extremely desirable and justified economically. This inherent cost justification for industries producing as a by-product keratin-compositions does not exclude the use of the invention in other industries where the need for such low-ash content filter medium is significant.

In food processing industries air flotation systems are often used to concentrate the solids or sludge, which are then filtered, under pressure, through a septum to dewater the sludge, forming a higher solids cake. In such processes the keratin-composition meal is advantageously used as a filter precoat. For instance, the keratin-composition meal may be applied to the filter septum in a water slurry whereby the meal is strained from the slurry by the septum and held against the septum by the force of gravity for septums disposed along the horizontal and/or by the force of a fluid stream, for instance where there is a constant water stream flowing through the septum from the time of application of the precoat to the time of its use in straining solids. It is common to apply pressure during the formation of the sludge cake in order to increase the solids thereof. Such pressure may be applied by a pressure plate, that is a plate of similar cross-section as the septum's surface that moves towards the septum, compacting the cake to increase the solids thereof. For a given septum and a given pressure, the solids concentration achieved is believed dependent upon the nature of the solids, the chemical treatment(s) to which the solids have been subjected, if any, and the filter precoat used. The present invention in the embodiment of the keratin-composition meal as a filter medium, and particularly as a filter precoat, has been found to have advantageous water-release properties, providing high solids sludge cakes.

In further preferred embodiment, the present invention is a method of clarifying water that contains suspended solids wherein the water is subjected to chemical and/or air flotation treatment to concentrate the solids into a separable fraction, the fraction is separated, and then the solids are separated from a substantial portion of the water of the fraction by filtration, using the keratin-composition meal as at least part of the filter media, with or without further chemical treatment. The filtration may be pressurized, particularly when the keratin-composition meal is used as a septum filter precoat.

As mentioned briefly above, in an embodiment the process of the present invention includes admixing the solids-containing aqueous medium or sludge with a combination of an organic polymeric flocculant and an organic polymeric coagulant. As such terms are used herein is meant for the flocculant a polymer having a molecular weight of at least 1,000,000, which polymer may be cationic, anionic, or nonionic. Examples of such cationic polymers include copolymers of acrylamide with dimethylaminoethylmethacrylate quaternary ammonium salt, copolymers of acrylamide with diallyldimethylammonium chloride, or Mannich amines. Examples of anionic flocculants include polyacrylates and copolymers of acrylamide and acrylates. Examples of nonionic flocculants include polyacrylamides. As such terms are used herein is meant for the coagulant a cationic polymer having a molecular weight below 100,000, and includes such polymers as polyamines, polyquaternary ammonium salts, polydiallyldimethylammonium chloride, and epichlorohydrin/dimethylamine polymers. All of such polymers can be made by methods known to those of ordinary skill in the art. A preferred combination is the combination of an organic flocculant which is a polymer having from 5 to 70 mole percent acrylic acid units, or acrylate units, and from 30 to 95 mole percent acrylamide units, together with an organic coagulant having from 10 to 80 mole percent acrylamide units and from 20 to 90 mole percent units of a quaternary ammonium salt of dimethylaminoethylmethacrylate. In further preferred embodiment the flocculant is a polymer having from 15 to 50 mole percent acrylic acid units, or acrylate units, and from 50 to 85 mole percent acrylamide units, and the coagulant is a polymer having from 15 to 55 mole percent acrylamide units and from 45 to 85 mole percent units of a quaternary ammonium salt of dimethylaminoethylmethacrylate. A preferred concentration level of such flocculant and coagulant separately, and more preferably each, is from 20 to 5,000 ppm, based on total solids-containing aqueous medium or sludge being filtered, and more preferably from 50 to 1,000 ppm, same basis.

In preferred embodiment, the keratin-composition meal is applied to, or precoated on, the septum in an amount of from about 0.05 to 10 parts by weight for each 100 parts by weight of the solids-containing aqueous medium, or sludge, being filtered, and in more preferred embodiment in an amount of from about 0.1 to 2 parts by weight for each 100 parts, same basis.

In another preferred embodiment, the keratin-composition meal is applied to, or precoated on, the septum in an amount of from about 0.5 to 20 grams for each liter of solids-containing medium, or sludge, to be filtered, and more preferably in an amount of 2 to 10 grams per liter, same basis.

As discussed above, a further preferred embodiment is wherein the solids-containing aqueous medium, or sludge, has been concentrated prior to filtration by air flotation treatment, and in further preferred embodiment wherein the air flotation treatment ("DAF") includes a chemical treatment with ferric chloride and a flocculating agent. As indicated above, such concentrating treatment provides a float of sludge having a higher concentration of solids than the water stream from which is was derived, and it is such higher solids fraction that preferably is subjected to filtration. When the combination of flocculant and coagulant treatment is being used, it is this higher solids sludge layer that is being admixed with such combination, which should be distinguished from such other chemical treatment, such as ferric chloride and flocculant treatment, used on the water stream initially to provide the concentrated fraction.

In further preferred embodiment, the solids-containing aqueous medium, or sludge, has been concentrated prior to filtration to a solids level of from about 1 to about 10 weight percent.

EXAMPLE 1

A keratin-composition meal was prepared as follows. A quantity of chicken feathers, recovered from a chicken processing plant, were placed into a steam pressure cooker and therein heated to 190°–200° F. for about 2 to 3 hours, after which the feather material was cooled and filtered through a shaker screen to remove any large pieces. The resultant keratin-composition meal was subjected to a Sieve Analysis to determine its particle size distribution, which was determined to be as set forth in Table I below.

TABLE I

| U.S. Standard Sieve Mesh No. | Particle Size (MM) | Wt. % Retained |
|---|---|---|
| 10 | ≧2.0 | 10.0 |
| 18 | 1–2 | 15.1 |
| 35 | 0.5–1.0 | 31.3 |
| 60 | 0.25–0.50 | 33.8 |
| 120 | 0.125–0.25 | 9.5 |
| 230 | 0.0625–0.125 | 0.3 |
| 325 | 0.044–0.625 | 0.0 |
| Through | less than 0.044 | 0.0 |

The keratin-composition meal prepared as described above in Example 1 is suitable for use as the precoat material for the processes described in Examples 2 and 3 below, which exemplify the dewatering of sludge of the type concentrated by a DAF process in a chicken processing plant. Such type of processes are advantageous because the chicken feather starting material for the precoat material may be a by-product of the chicken processing, and in addition the dewatered cake provided by the dewatering may be reprocessed, for instance for use animal feed such as chicken feed, the precoat material taken up into the cake not increasing the ash contect by virtue of its organic nature. The following organic polymer flocculants and coagulants are suitable for the processes described in Examples 2 and 3. For both Examples 2 and 3, a suitable anionic flocculant is a copolymer having 29 mole percent acrylic acid, as the sodium salt, and 71 mole percent acrylamide, and having a reduced specific viscosity of from 42 to 50. For both Examples 2 and 3, a suitable cationic coagulant is a copolymer having 34 mole percent acrylamide and 66 mole percent of the methyl chloride quaternary ammonium salt of dimethylaminoethylmethacrylate, and having a reduced specific viscosity of less than 11. The combination of such flocculant and coagulant at the levels specified in Examples 2 and 3 should provide results of the order that is attributed to these Examples. Another cationic coagulant possibly utilized in processes such as that described in Examples 2 and 3 is a copolymer having 62 mole percent acrylamide and 38 mole percent diallyldimethylammonium chloride. These specific polymers are noted to describe embodiments believed to be the best mode of the invention in combination with the process steps described in Examples 2 and 3. Examples 2 and 3 are descriptions, in turn, of pilot plant type determinations of efficacies of methods tested, and provide a flow rate of about 0.14 to 0.15 gal/ft$^2$/min. through the filter medium. Such processes, on a larger industrial scale, are believed to provide, with from about 20 to 25 cycles per 24 hours, a process that so filters and dewaters from about 113,000 to about 117,000 gallons of sludge per day.

EXAMPLE 2

The following exemplifies the use of the process of the present invention for the dewatering of sludge by using the keratin-composition as a filter precoat. The sludge may be derived from the process water stream of a chicken processing plant, wherein the sludge has been first concentrated by a DAF process in combination with a ferric chloride plus anionic polymer chemical treatment, and then separated from the process water stream generally. As so separated, the sludge has a density of 632 grams/liter. To 15 liters of such sludge is added 2.4 liters of a 0.5 weight percent solution of an anionic flocculant, and 0.2 liters of a 0.1 weight percent solution of a cationic coagulant, with admixing. Such addition provides a mixture having about 680 ppm of anionic flocculant and 114 ppm cationic coagulant. This sludge mixture is then pumped through a filter medium under pressure of initially 37 PSI, increasing to about 58 PSI after 20 minutes, at which time the pumping is stopped. The filter medium is a 003 polypropylene membrane precoated with 3 oz. of keratin-composition. The filtrate resultant from this process is generally clear and has a density close to 1000 g./l. About from 85 to 90 percent reduction of sludge volume may be achieved by this process.

EXAMPLE 3

The following is another example of the use of the process of the present invention for the dewatering of sludge by using the keratin-composition as a filter precoat. Again the sludge may be derived from the process water stream of a chicken processing plant, wherein the sludge has been first concentrated by a DAF process. As separated the sludge has a density of about 1027 grams/liter. To 15 liters of such sludge is added 1.2 liters of a 0.5 weight percent solution of an anionic flocculant, and 0.45 liters of a cationic coagulant, with admixing. Such addition provides a mixture having about 400 ppm of anionic flocculant and 300 ppm of cationic coagulant. This sludge is then pumped through a filter medium under pressure of initially about 38 PSI, increasing to about 69 PSI after 20 minutes, at which time the pumping is stopped. The filter medium is a 003 polypropylene membrane precoated with 3 oz of keratin-composition. About 12 liters of filtrate is provided by such filtration, and such filtrate has a density of about 1004 grams per liter. About 85 to 90 percent reduction of the volume of the sludge fraction may be achieved by this process.

INDUSTRIAL APPLICABILITY OF THE INVENTION

The present invention is applicable to the water clarification industries and industries requiring removal of solids from water, including without limitation such industries as the food processing industries.

I claim:

1. In a process for separating solids from an aqueous medium by filtration through a porous septum, the improvement in which comprises:
    applying to the upstream surface of said porous septum a coating of keratin-composition meal, said keratin-composition meal being in the form of particles wherein at least 75 weight percent of said particles have a particle size no greater than 2.0 mm, and said keratin-composition meal being comprised of a keratin-composition containing at least 50 weight percent keratin; and
    then contacting said upstream surface of said porous septum with a solids-containing aqueous medium and permitting the aqueous medium to at least partially flow through said porous septum.

2. The process of claim 1 wherein said solids contained in said aqueous medium are at least partially comprised of organic material.

3. The process of claim 2 wherein said solids contained in said aqueous medium have been concentrated by chemical and/or physical means before said aqueous medium is contacted with said porous septum.

4. The process of claim 2 further including the step of admixing said solids-containing aqueous medium with a combination of an organic polymeric flocculant and an organic polymeric coagulant prior to contacting said porous septum with said solids-containing aqueous medium.

5. The process of claim 4 wherein said organic flocculant is admixed with said solids-containing aqueous medium in an amount to provide a concentration level of from about 20 to about 5,000 ppm.

6. The process of claim 4 wherein said organic coagulant is admixed with said solids-containing aqueous medium in an amount to provide a concentration level of from about 20 to about 5,000 ppm.

7. The process of claim 4 wherein said organic flocculant is admixed with said solids-containing aqueous medium in an amount to provide a concentration level of from about 50 to about 1,000 ppm and said organic polymeric coagulant is admixed with said solids-containing aqueous medium in an amount to provide a concentration level of from about 50 to about 1,000 ppm.

8. The process of claim 7 wherein said organic polymeric flocculant is a polymer having from 5 to 70 mole percent acrylic acid units and from 30 to 95 percent acrylamide units.

9. The process of claim 7 wherein said organic polymeric coagulant is a polymer having from 10 to 80 mole percent acrylamide units and from 20 to 90 mole percent units of a quaternary ammonium salt of dimethylaminoethylmethacrylate.

10. The process of claim 4 wherein said keratin-composition meal is derived from poultry feathers.

11. The process of claim 10 wherein the solids-containing aqueous medium contains at least in part process stream water from a poultry processing plant.

12. The process of claim 4 wherein said coating of keratic-composition meal is applied to said porous septum in the amount of from 0.05 to 10 parts by weight for each 100 parts by weight of said solids-containing aqueous medium being filtered.

13. The process of claim 12 wherein said coating of keratin-composition meal is applied to said porous septum in the amount of from 0.1 to 2 parts by weight for each 100 parts by weight of said solids-containing aqueous medium being filtered.

14. The process of claim 1 wherein said keratin-composition contains at least 70 weight percent keratin.

15. In a process for dewatering sludge from a processing water by filtration through a porous septum, the improvement of which comprises:
    applying to said porous septum a precoat of keratin-composition meal prior to filtration,
    wherein said keratin-composition meal is a karatin-composition containing at least 50 weight percent keratin and said keratin-composition meal is in the form of particles wherein at least 75 weight percent of said particles have a particle size no greater than 2.0 mm.

16. The process of claim 15 wherein said sludge has been concentrated prior to filtration to a solids level of from about 1 to about 10 weight percent.

17. The process of claim 15 further including the step of admixing a combination of organic polymeric flocculant and organic polymeric coagulant with said sludge prior to filtration.

18. The process of claim 17 wherein said organic polymeric flocculant and said organic polymeric coagulant are each admixed with said sludge to provide a concentration level of from 20 to 5,000 ppm.

19. The process of claim 18 wherein said organic polymeric flocculant and said organic polymeric coagulant are each admixed with said sludge to provide a concentration level of from 50 to 1,000 ppm.

20. The process of claim 19 wherein said organic polymeric flocculant is a polymer having from 5 to 70 mole percent acrylic acid units and from 30 to 95 mole percent acrylamide units, and
    wherein said organic polymeric coagulant is a polymer having from 10 to 80 mole percent acrylamide units and from 20 to 90 mole percent units of a quaternary ammonium salt of dimethylaminoethylmethacrylate.

21. The process of claim 15 wherein said sludge is derived from a processing water stream of a food processing plant.

22. The process of claim 21 wherein the sludge, prior to filtration, has been admixed with a combination of an organic polymeric flocculant and an organic polymeric coagulant, said flocculant being a polymer having from 15 to 50 mole percent acrylic acid units and from 50 to 85 mole percent acrylamide units, and said coagulant being a polymer having from 15 to 55 mole percent acrylamide units and from 45 to 85 mole percent units of a quaternary ammonium salt of dimethylaminoethylmethacrylate.

23. The process of claim 22 wherein said organic polymeric flocculant is admixed in an amount to provide a concentration level of from 50 to 1,000 ppm.

24. The process of claim 22 wherein said organic polymeric coagulant is admixed in an amount to provide a concentration level of from 50 to 1,000 ppm.

25. The process of claim 22 wherein said keratin-composition meal is applied to said porous septum in the amount of from 0.1 to 2 parts by weight from each 100 parts by weight of said sludge.

26. The process of claim 16 wherein said sludge has been concentrated prior to filtration by air flotation treatment.

27. The process of claim 26 wherein said air flotation treatment includes a chemical treatment with ferric chloride and a flocculant agent.

28. The process of claim 15 wherein said keratin-composition contains at least 70 weight percent keratin.

29. A process for clarifying water that contains suspended solids by concentrating the solids into a separable sludge fraction, separating said sludge fraction, and then removing a substantial portion of the water from said sludge fraction by filtration, the improvement in which comprises:
the use of keratin-composition meal as a portion of the filter media for said filtration;
wherein said keratin-composition meal is a keratin-composition containing at least 50 weight percent keratin and said keratin-composition meal is in the form of particles wherein at least 75 weight percent of said particles have a particle size no greater than 2.0 mm.

30. The process of claim 29 further including the step of adding to said sludge fraction a combination of organic polymer flocculant and organic polymeric coagulant prior to filtration.

31. The process of claim 30 wherein said organic polymeric flocculant is a polymer having from 5 to 70 mole percent acrylic acid units and from 30 to 95 mole percent acrylamide units, and said organic polymeric coagulant is a polymer having from 10 to 80 mole percent acrylamide units and from 20 to 90 mole percent units of a quaternary ammonium salt of dimethylaminoethylmethacrylate.

32. The process of claim 31 wherein each of said organic polymer flocculant and organic polymeric coagulant is added to said sludge fraction to provide a level of concentration of from 50 to 1,000 ppm.

33. The process of claim 29 wherein said keratin-composition meal is used as a portion of the filter media in the amount of 0.5 to 20 grams for each liter of said sludge fraction being filtered.

34. The process of claim 29 wherein said keratin-composition contains at least 70 weight percent keratin.

* * * * *